United States Patent [19]

Fischer et al.

[11] 4,395,427

[45] Jul. 26, 1983

[54] METHOD AND APPARATUS FOR DEPOSITING DOUGH ON A CONVEYOR

[75] Inventors: Harry A. Fischer, Ada; Paul J. Koepnick, Grand Rapids; Thomas A. Dennis, Nunica; Joseph R. Anderson, Ada, all of Mich.

[73] Assignee: Werner Lehara, Inc., Grand Rapids, Mich.

[21] Appl. No.: 262,999

[22] Filed: May 12, 1981

[51] Int. Cl.³ .............................. A23P 1/00; B29F 3/04
[52] U.S. Cl. ..................................... 426/231; 264/40.7; 264/142; 264/145; 264/148; 222/483; 425/296; 425/308; 425/377; 425/383; 425/466; 426/503; 426/512
[58] Field of Search ............ 425/460, 464, 466, 381.2, 425/289, 308, 311, 324.1, 461, 465, 296, 377, 383; 264/145, 148, 40.7, 177 R; 251/205, 212; 137/625.33, 862, 595; 426/231, 503, 512, 516; 222/483

[56] References Cited

U.S. PATENT DOCUMENTS

| | | | |
|---|---|---|---|
| 1,252,821 | 1/1918 | Lewis | 425/466 |
| 2,022,895 | 12/1935 | Morrell | 264/148 |
| 2,026,740 | 1/1936 | Kinsella | 425/466 |
| 2,270,433 | 1/1942 | Goffredo | 251/212 |
| 2,377,668 | 6/1945 | Bole et al. | 425/311 |
| 2,532,131 | 11/1950 | Voorst | 425/464 |
| 2,566,854 | 9/1951 | Rhodes | 264/40.7 |
| 2,614,789 | 10/1952 | Labour | 251/212 |
| 2,677,335 | 5/1954 | Maldari | 425/464 |
| 2,679,216 | 5/1954 | Grondona | 425/466 |
| 2,738,549 | 3/1956 | Pazitney et al. | 425/466 |
| 2,905,109 | 9/1959 | Schrenk | 425/308 |
| 3,256,563 | 6/1966 | Criss et al. | 425/464 |

Primary Examiner—Willard E. Hoag
Attorney, Agent, or Firm—Price, Heneveld, Huizenga & Cooper

[57] ABSTRACT

A depositing apparatus for the manufacture of shaped food product includes a hopper having an open top for receiving a prepared mix. Feed rollers positioned within the lower end of the hopper force mix through an extrusion die assembly. The die assembly includes an elongated plate defining a plurality of apertures and supporting a plurality of dies in coaxial relationship with the apertures. A variable restrictor is supported at each of the apertures for varying the effective open area or flow area of the apertures. The flow area may be varied to compensate for variations in weight, consistency or volume of the mix so that relatively uniform weight shapes are deposited onto a conveyor passing underneath the feed hopper. The variable restrictor includes a pair of opposed plates having edges configured in a complementary fashion to the cross-sectional shape of the die. A drive is operably connected to each of the plates so that they may be moved towards and away from each other into the aperture.

23 Claims, 5 Drawing Figures

METHOD AND APPARATUS FOR DEPOSITING DOUGH ON A CONVEYOR

BACKGROUND OF THE INVENTION

The present invention relates to a method and apparatus for depositing baking dough or confectionery mass onto a surface in the manufacture of cookies, confectionery and the like.

Typically, baking dough or confectionery mass, used, for example, in manufacturing cookies and some candies, is formulated and prepared in a mixer. Such dough or confectionary mass, due to its nature, is not truly or strictly a homogeneous substance, due to such variables as temperature, humidity and the like, which may not be absolutely uniform throughout the mix.

Generally, a dough or confectionery mass is placed in a depositing apparatus after having been prepared. Such apparatus typically includes a hopper having an open top to receive the prepared mix, and one or more feed rollers or other discharge devices positioned at least partially within the confines of the hopper. Such devices force the "mix" (as used herein, any dough or confectionery mass) through a plurality of apertures and into deposition or extrusion dies, cups or nozzles which open through the bottom of the hopper. The mix is extruded onto a moving conveyor positioned underneath the hopper. Provision, usually in the form of a shiftable wire or blade, is made for severing the dough after a particular portion of it is extruded, so that a plurality of shapes or forms of cookies or candy, for example, are deposited on the conveyor in a plurality of transversely spaced lanes. The shapes are arranged in tandem within each lane. The conveyor moves the shapes to an oven for baking, or to other stations for other processing. Examples of dough depositing apparatus may be found in commonly owned U.S. Pat. No. 3,547,050, entitled DOUGH DEPOSITING MACHINE and issued on Dec. 15, 1970, in the name of Verhoeven and commonly owned U.S. Pat. No. 3,940,226, entitled APPARATUS FOR DISPENSING DOUGH IN A PATTERN UTILIZING MOVEABLE NOZZLES and issued on Feb. 24, 1976, in the name of Verhoeven.

Problems have been experienced with controlling the weight of the cookie and candy shapes deposited onto the conveyor so that each shape has substantially the same weight. The apertures opening into the dies are usually of a fixed cross-sectional area. This cross-sectional area defines the flow area into the nozzles or dies and the dough flow rate through the dies is directly related to the area. Different amounts by weight and/or volume of the dough may be deposited onto the conveyor from different apertures and dies due to differences in dough consistency and/or flow rates. The cookie or candy shapes in adjacent lanes on the conveyor may not be substantially the same weight. As a result, some shapes may be too large or some shapes may be too small in adjacent lanes. This problem can reduce the overall quality and/or uniformity of the resulting cookie or candy product. The mix may be wasted, in that a fewer number of cookie or candy shapes may be formed from a given quantity of mix than desired or anticipated.

At least one attempt has been made to solve the aforementioned problem. In this attempt, an elongated rod-like member or screw has been inserted into the aperture and/or the die area in an attempt to control the mix flowing through the extrusion die. The rod introduces a certain restriction. The mix being forced through the aperture and into the extrusion die must pass around and over the rod. This method is of very limited usefulness and has not provided acceptable weight and/or volume control of the cookie or candy forms or shapes deposited onto the conveyor beneath the hopper.

SUMMARY OF THE INVENTION

A need exists for apparatus and a method for insuring that substantial equal quantities by weight of mix are deposited onto the moving conveyor of a cookie dough or candy mass depositing apparatus. In accordance with the present invention, these needs are substantially fulfilled.

Essentially, a variable orifice die assembly is mounted at the outlet of the hopper of a dough depositing apparatus. The die assembly includes an elongated plate defining a plurality of apertures. A plurality of dies are positioned coaxially with the apertures. A balanced variable restrictor means is disposed at each of the apertures for selectively varying the effective open or flow area of the apertures to compensate for localized variations in mix volume, density, weight and flow rates. By monitoring the weight of the cookie or candy shpes, the operator can selectively actuate the balanced variable restrictor means to insure that a substantially constant weight of mix is contained in each of the forms or shapes within the lanes.

In narrower aspects of the invention, the variable restrictor means includes a pair of opposed plates, each of which has facing edges. The facing edges are configured to be "complementary" to the cross-sectional shape of the die. The complementary configuration need not be the same general cross-sectional shape of the die. Rather, the configuration is a shape which complements the die cross-sectional shape in the sense of insuring that the desired cookie form or shape is deposited onto the conveyor. Drive means are provided for shifting the plates towards each other within the apertures defined by the elongated plate.

DETAILED DESCRIPTION OF THE PREFERRED EMBODIMENT

Figure 1:
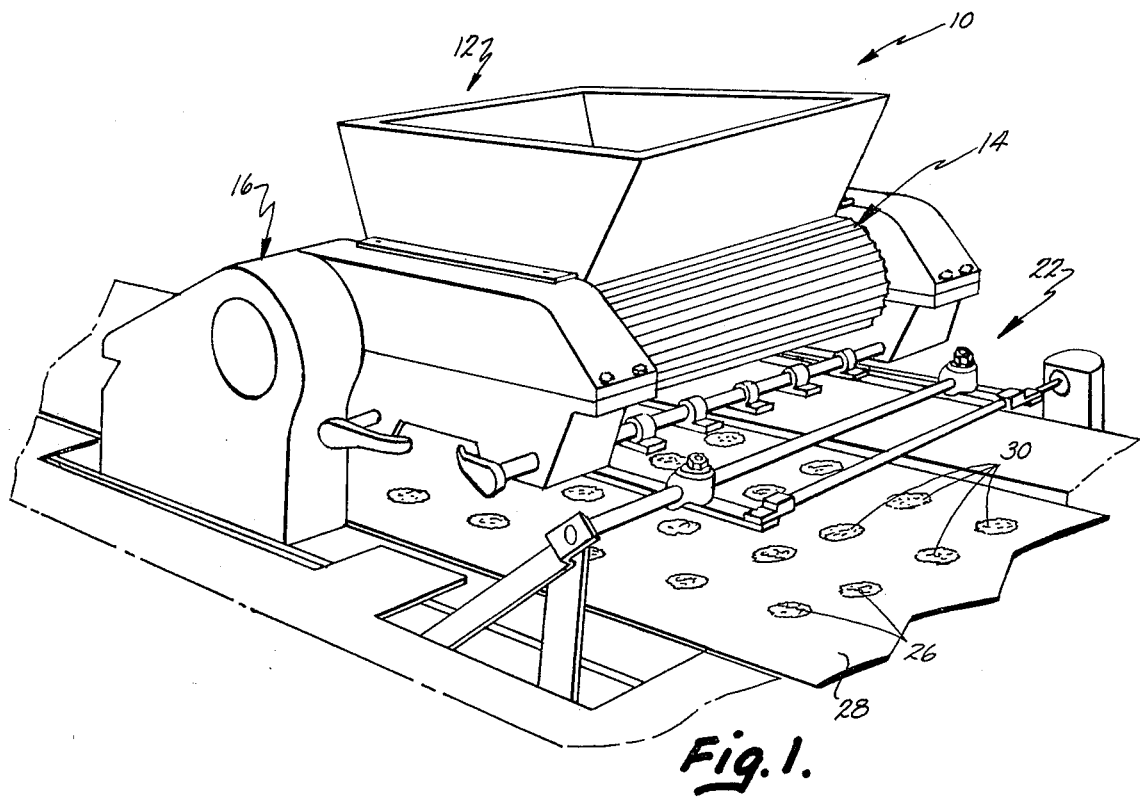
FIG. 1 is a fragmentary, perspective view of a depositing machine in accordance with the present invention.
Figure 2:
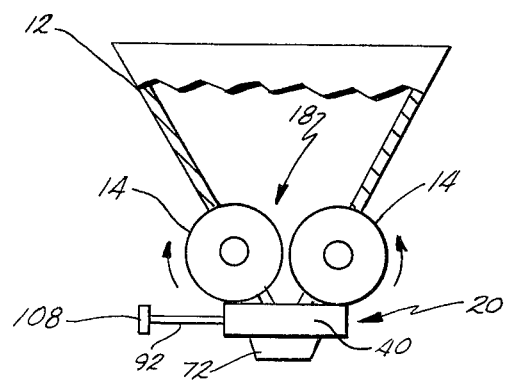
FIG. 2 is a cross-sectional view schematically illustrating the depositing machine.

FIG. 1 illustrates a mix depositing apparatus generally designated 10 which incorporates the variable orifice die assembly in accordance with the present invention. The mix depositing apparatus includes an open top hopper 12 and a pair of rollers 14 positioned adjacent the bottom of the hopper and extending at least partially within the hopper. This is schematically illustrated in FIG. 2. The rollers, which are preferably grooved, are driven by a drive mechanism enclosed within a housing 16. Mix is deposited within hopper 12. The rollers force the mix through a nip 18 (FIG. 2) to an extrusion or orifice assembly, generally designated 20 in FIG. 2. The mix after being forced through the extrusion assembly 20 is cut by a wire cut-off mechanism generally designated 22. The cut-off mechanism severs the mix at the outlets of the extrusion assembly, as explained below, when the desired quantity has been forced therethrough. As seen in FIG. 1, a plurality of lanes 26 of cookie or candy shapes or forms are deposited onto a moving conveyor 28. Each of the lanes 26 includes a plurality of tandemly arranged cookie or candy shapes 30.

The basic structure of the roller extruder or mix depositing apparatus as described above and illustrated in FIGS. 1 and 2 is known in the art. In varying arrangements, one or more feed rollers, as well as other forms of mechanisms besides the described wire cut-off assembly 20, may be employed. For example, a reciprocating blade arrangement has been used with such mix depositing machines. Also, commonly owned U.S. Pat. No. 3,547,050 discloses a single roller disposed at least partially within the hopper which cooperates with the reciprocating plunger to push the mix through an extrusion assembly. Such could be used in place of the two rollers.

As mentioned above, the mix deposited within the hopper 12 is nonhomogeneous and has localized variations in consistency and/or weight at the dies. Also, the flow rates through the dies may vary from die to die. This has resulted in the cookie or candy shapes or forms 30 deposited on the conveyor 28 having varying weights within different lanes. In accordance with the present invention, a variable orifice extruder or die assembly is provided which permits individual weight control by lane.

Figure 3:
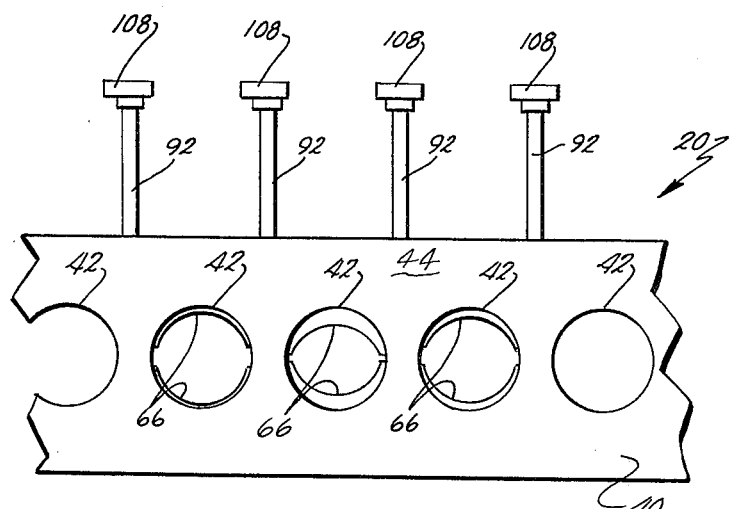
FIG. 3 is a fragmentary, top plan view of the variable orifice die assembly incorporated in the depositing machine.
Figure 5:
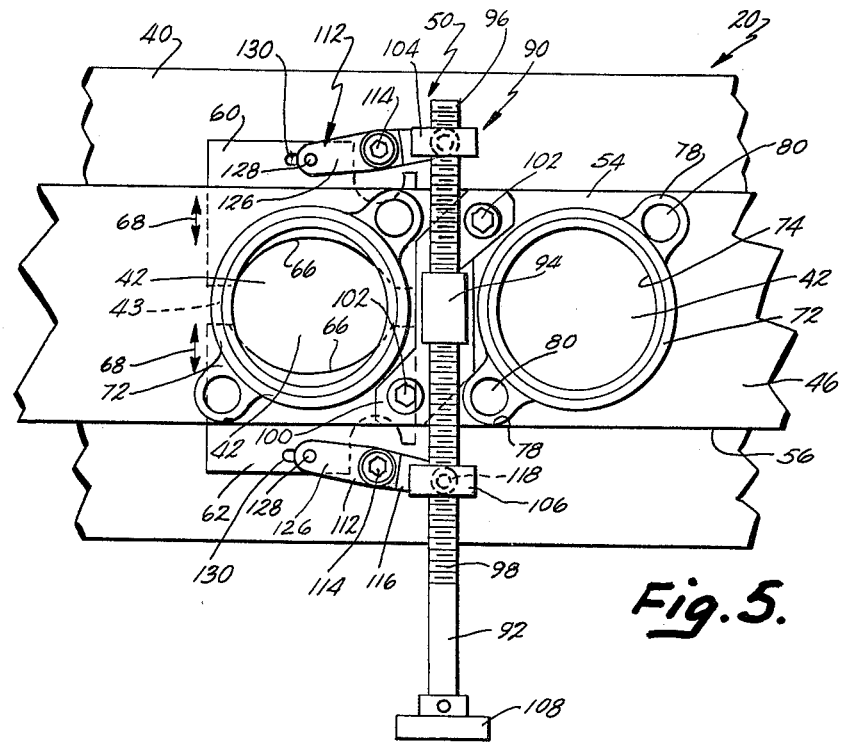
FIG. 5 is a fragmentary, bottom plan view of the die assembly.
Figure 4:
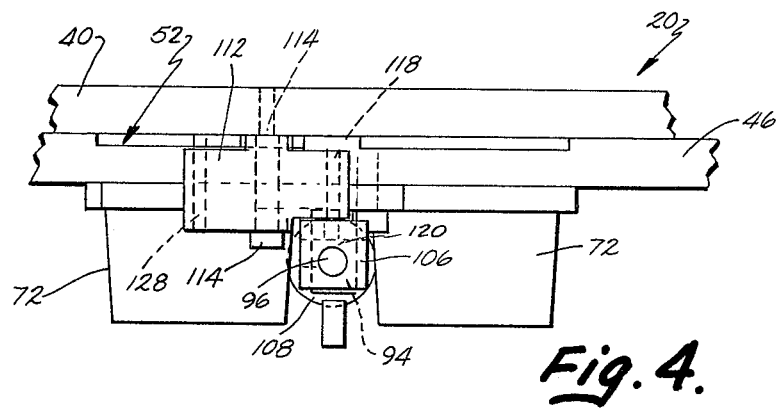
FIG. 4 is a rear, fragmentary, elevational view of the die assembly.

The variable orifice die assembly, generally designated 20, is illustrated in FIGS. 3, 4 and 5. Assembly 20 includes a support plate 40 which is positioned immediately below the feed rollers 14 of the dough depositing apparatus. This is schematically illustrated in FIG. 2. The elongated support plate defines a plurality of tandemly arranged and equally spaced apertures 42 which open through the top surface 44 of plate 40. In the embodiment illustrated, apertures 42 are circular in shape and define a fixed open or flow area. As seen in FIGS. 4 and 5, a second elongated support plate 46 is secured to the undersurface of support plate 40. Second support plate 46 also defines a plurality of apertures 43 which have the same diameter as apertures 42 and are aligned therewith.

Secured to support plates 40 and 46 are a plurality of variable restrictor means 50. In the preferred embodiment, a variable restrictor means 50 is provided for each of the apertures 42 of the die or extrusion assembly 20. As seen in FIGS. 4 and 5, support plate 46 defines a plurality of transversely extending channel-shaped slots or passages 52. Slots 52 open through lateral edges 54, 56 of plate 46.

Slidably disposed within each of the slots 52 are a pair of orifice or restrictor plates 60, 62. For simplicity, only a single variable restrictor means 50 is illustrated in FIGS. 4 and 5. Orifice plates 60, 62 are generally rectangular in configuration in plan. These plates, however, define opposed, facing, configured edges 66. As seen in FIGS. 3 and 5, the configured edges 66 in the embodiment illustrated have the same radius of curvature and close towards each other. As should be apparent, plates 60, 62 may be slid towards and away from each other as indicated by the arrows 68 in FIG. 5. When moved towards each other, they enter the aperture 42 through its periphery thereby restricting or changing the effective open or flow area of the aperture.

As seen in FIGS. 4 and 5, a plurality of extrusion dies 72 are secured to the undersurface of support plate 46. In the embodiment shown, each of the extrusion dies 72 is generally cup-shaped in configuration and defines an elongated bore 74 which is coaxial with apertures 42, 43. Each die 72 is formed with mounting flanges 78 at which the die is secured to support plate 46 by suitable fasteners 80. The drawings merely illustrate one form of extrusion die for which the present apparatus and method are adapted. Other configurations may, of course, be employed in the depositing apparatus, depending upon the specific cookie or candy shape or form desired. For example, a rectangular die in cross-section may be used when it is desired to form rectangular-shaped food products. Die 72, as illustrated, is primarily adapted for forming circular-shaped food products.

As seen in FIGS. 3 and 5, configured opposed edges 66 of plates 60, 62 are "complementary" to the die shape and to the shape of the apertures 42. Apertures 42 and the extrusion dies 72 are generally circular in configuration. Opposed edges 66 of plates 60, 62 define an oval or egg-shaped opening when moved towards each other. The edges, in other words, have a radius of curvature which is greater than the radius of curvature of aperture 42 and bore 74 of each extrusion die.

The plates and the configured edges when moved towards each other, as seen in FIG. 5, define a balanced restriction. The plates enter from opposite and hence complementary portions of the periphery of the aperture 42. When mix is forced through the restricted area defined by the opposed edges 66 by feed rolls 14, it will expand and fill bore 74 of die 72 to assume the shape of the die. The plates are complementary in the sense that term is used herein, i.e., they cooperate with the die shape to achieve the desired food product shape after baking or other final processing. They produce the shape of the die discharge opening. The restriction is balanced, and the mix is not forced over a discontinuity or member which extends into or through the middle of the die as in prior devices.

When circular or other curved die shapes are employed, it has been found that an oval configuration of the opposed edges provides the desired results. If it is desired to form rectangular-shaped or other straight-sided food product and a generally rectangular or other such die is employed, the opposed edges of the plates would be somewhat moon-shaped tongues, configured to starve the mid-portions of the sides of the die, which would cause the corners to fill out. This further illustrates the use of the term "complementary" as used herein.

As best seen in FIGS. 4 and 5, a drive means generally designated 90 is provided for uniformly shifting the restrictor plates 60, 62 towards and away from each other. Drive means 90 includes an elongated lead screw 92 rotatably supported within a bearing housing 94. Lead screw 92 is secured longitudinally of bearing housing 94 by suitable circlips (not shown) disposed within grooves which extend around the circumference of the screw. Lead screws 92 includes a first threaded portion 96 which is threaded oppositely to a second threaded portion 98. Housing 94 is secured to support plate 46 by ears 100 and suitable fasteners 102.

Threadably disposed on threaded portions 96, 98 are followers 104, 106. Each follower 104, 106 is internally threaded. As a result, rotation of lead screw 92, such as by manually grasping knob 108, will cause the followers 104, 106 to simultaneously move towards or away from each other, depending upon the direction of rotation.

Followers 104, 106 are operably connected to plates 60, 62, respectively, by bell cranks or pivoted levers 112. Each lever 112 is pivoted to support plate 40 by a suitable pivot pin or fastener 114. A first leg 116 of each lever 112 has a pin 118 fixed thereto which extends into a suitable bore 120 defined by each follower 104, 106. A second leg 126 of each bell crank 112 supports a pin 128. Pin 128 extends into an elongated slot 130 defined by each plate 60, 62.

As should be readily apparent from FIG. 5, rotation of lead screw 92 in a direction which causes followers 104, 106 to move towards each other will cause the bell cranks to pivot about pivot pins 114 with bell crank legs 116 moving towards each other. This causes pins 128 to slide within slots 130 and plates 60, 62 to be slid away from each other within slots 52. This moves the configured edges 66 away from each other so that the effective flow area of aperture 42 is increased until its maximum is reached. Rotation of the lead screw 92 in the opposite direction causes plates 60, 62 to be moved towards each other thereby restricting the effective flow area of aperture 42. Mechanism 20, therefore, provides a variable orifice or restriction at each of the dies or cups of the extrusion assembly.

OPERATION

In use, a quantity of the mix is deposited into the open end of hopper 12. Grooved rollers 14 are actuated and force the mix towards the die assembly 20. The mix is forced through apertures 42 and through the respective bores 74 of each die or extrusion cup 72. Cutting assembly 22 is actuated on a timed basis in accordance with known methods to sever the mix at the discharge or lower ends of the dies. Shaped food product forms 30 are deposited in lanes on the conveyor 28.

The machine operator monitors the configuration, size and weight of the food product 30 produced by the apparatus. This monitoring may take the form of "feedback" after the food product is further processed and weighed. When a particular lane 26 has food product 30 which is of greater or lesser weight than desired, the operator rotates a lead screw 92 at that particular lane to vary the effective flow area of the aperture 42. Rotation of lead screw 92, as discussed in detail above, causes the restrictor plates 60, 62 to move towards or away from each other. If the weight of the food product deposited on the conveyor 28 is too great, a reduction in the flow area will reduce the weight in that particular lane. If the weight of the food product is too little, the lead screw would be rotated to shift plates 60, 62 away from each other, thereby increasing the effective flow area of aperture 42. By monitoring the depositing process and selectively rotating the lead screws 92, more efficient and complete use of the mix and uniformity will be achieved.

Typically, the plates would be initially positioned within the apertures at the manufacturer's facility to achieve essentially uniform pressure drop across the dies. The adjustments during use may be opening or closing of the aperture to achieve weight control through volume control. The rollers above the dies create a relatively constant pressure and the restrictors create a back pressure and restrict flow. The ultimate purpose of the method and apparatus is weight control. The immediate effect is, however, volume control due to the relatively constant specific density of the mix at a given extrusion orifice or die.

The subject process insures that substantially equal weight food product will be transferred to further processing by conveyor 28. This eliminates mix wastage and insures more uniformity in the resulting food product. This, of course, also provides significant cost savings to the manufacturer.

In view of the foregoing description, those of ordinary skill in the art will undoubtedly envision various modifications to the present invention which would not depart from the unique and patentable concepts incorporated therein. For example, as discussed above, the configuration of the restrictor plates 60, 62 could vary from that illustrated. The shape is, however, related to the configuration of the dies supported by the apparatus. Further, it is believed that a drive mechanism other than that illustrated could be used to simultaneously move the plates 60, 62 towards each other. It is also possible that the drive mechanism could be actuated by suitable servo motors. This would avoid the necessity of the operator manually turning the lead screws by grasping knobs 108. Such an arrangement could be readily adapted to the lead screws and would be well within the ordinary skill of the art in view of the present disclosure.

Therefore, it is expressly intended that the above description should be considered to be only that of the preferred embodiment. The true spirit and scope of the present invention may be determined by reference to the appended claims.

The embodiments of the invention in which an exclusive property or privilege is claimed are defined as follows:

1. A method of dispensing food product mix onto a conveyor or the like to make shaped food products, said method comprising the steps of:
   depositing a quantity of mix into a hopper, said hopper being of the type having a plurality of discharge apertures and a plurality of dies, each supported at one of said apertures;
   forcing the mix through said apertures and into said dies;
   severing the mix to form a shaped product which is deposited on the conveyor;
   monitoring the flow of mix through said dies and the food product shapes; and
   varying the flow area at selected ones of said apertures in a balanced, uniform fashion from complementary portions of the periphery of said selected ones of said apertures so that the weight of the food product shapes deposited onto the conveyor is maintained substantially the same from each of said dies.

2. A method as defined by claim 1 wherein said step of varying the flow area includes the step of sliding a pair of interconnected plates having opposed configured edges simultaneously towards each other, said edges of said plates being configured so that they are complementary to said dies.

3. A variable orifice die assembly mountable at the outlet of an extruder apparatus for depositing a controlled quantity of food product mix onto a conveyor and the like, said assembly comprising:
   a support plate defining an aperture;

a die secured to said plate coaxially with said aperture; and balanced variable restrictor means at said aperture for selectively varying the effective open area of said aperture to achieve a relatively uniform weight food product shape, said variable restrictor means comprising:

at least a pair of orifice plates having opposed, facing, configured edges;

mounting means engaging said orifice plates for mounting said orifice plates for movement towards and away from each other; and drive means operatively connected to said orifice plates for selectively moving said orifice plates towards and away from each other.

4. A variable orifice die assembly as defined by claim 3 wherein said die comprises a generally tubular member.

5. A variable orifice die assembly as defined by claim 3 wherein said drive means comprises:

an elongated rod having a first threaded portion and a second threaded portion which is threaded opposite to said first threaded portion;

first and second followers on said first and second threaded portions, respectively; and connecting means operatively connecting said followers to said orifice plates for shifting said orifice plates towards and away from each other as said followers move towards and away from each other upon rotation of said rod.

6. A variable orifice die assembly as defined by claim 5 wherein said connecting means comprises a pair of bell cranks, each pivoted to said support plate and having one end connected to one of said orifice plates and the other end connected to one of said followers.

7. A variable orifice die assembly as defined by claim 6 wherein each of said followers defines a bore and said other end of said bell crank includes a pin disposed in said bore.

8. A variable orifice die assembly as defined by claim 7 wherein each of said orifice plates defines an elongated slot and said one end of each of said bell cranks includes a pin slidably disposed in said slot.

9. A variable orifice die assembly as defined by claim 3 wherein said opposed edges of said orifice plates are generally semicircular in plan.

10. A variable orifice die assembly as defined by claim 7 wherein each of said dies comprises a generally tubular member having a circular bore, said opposed edges of said orifice plates having a radius of curvature greater than the radius of said circular bore.

11. A variable orifice die assembly as defined by claim 10 wherein said drive means comprises:

an elongated rod having a first threaded portion and a second threaded portion which thread opposite said first threaded portion;

first and second followers on said first and second threaded portions, respectively; and connecting means operatively connecting said followers to said orifice plates for shifting said orifice plates towards and away from each other as said followers move towards and away from each other upon rotation of said rod.

12. A variable orifice die assembly as defined by claim 11 wherein said connecting means comprises a pair of bell cranks, each pivoted to said support plate and having one end connected to one of said orifice plates and the other end connected to one of said followers.

13. A variable orifice die assembly as defined by claim 12 wherein each of said followers defines a bore and said other end of said bell crank includes a pin disposed in said bore.

14. A variable orifice die assembly as defined by claim 13 wherein each of said plates defines an elongated slot and said one end of each of said bell cranks includes a pin slidably disposed in said slot.

15. In a dispensing apparatus for making shaped food products, said apparatus being of the type having a hopper for receiving a quantity of mix and means for discharging the mix out of a hopper outlet and onto a conveyor, the improvement comprising an improved extrusion die assembly at said hopper outlet, said die assembly including:

a support member defining a plurality of spaced apertures, each of said apertures including a periphery;

a plurality of dies, each die being aligned with one of said apertures; and a plurality of balanced variable restrictor means on said support member, each restrictor means positioned at one of said apertures for selectively and uniformly varying the effective flow area of each of said apertures in a balanced fashion to control the volume of mix passing through said apertures to compensate for localized variations in mix density at each aperture to achieve an essentially uniform weight food product shape deposited onto said conveyor, said restrictor means being complementary to said dies and wherein said restrictor means reduces the said flow area from complementary portions of the periphery of said aperture.

16. In a dispensing apparatus as defined by claim 15 wherein each of said variable restrictor means comprises:

a pair of spaced, interrelated restrictor plates having opposed, facing configured edges complementary to said aperture; and mounting means supporting said restrictor plates for slidably mounting said plates so that the configured edges may be simultaneously moved into said apertures and towards and away from each other.

17. In a dispensing apparatus as defined by claim 16 wherein said variable restrictor means further includes:

drive means operatively connected to both said restrictor plates for selectively moving said restrictor plates simultaneously towards and away from each other in balanced relationship to vary the effective flow area of said apertures.

18. In a dispensing apparatus for making shaped food products, said apparatus being of the type having a hopper for receiving a quantity of mix and means for discharging the mix out of a hopper outlet, the improvement comprising an improved extrusion die assembly at said hopper outlet, said die assembly including:

a support member defining a plurality of spaced apertures;

a plurality of dies, each die being aligned with one of said apertures;

a plurality of balanced variable restrictor means on said support member, each restrictor means positioned at one of said apertures for selectively varying the effective flow area of said apertures to compensate for localized variations in mix density to achieve an essentially uniform weight food product shape deposited onto said conveyor, each of said variable restrictor means comprising;

a pair of spaced restrictor plates having opposed, facing configured edges, mounting means supporting said restrictor plates for slidably mounting said plates so that the configured edges may be moved into said apertures and towards and away from each other, drive means operatively connected to said restrictor plates for selectively moving said restrictor plates towards and away from each other to vary the effective flow area of said apertures;

said drive means comprising;

an elongated rod having a first threaded portion and a second threaded portion which is threaded opposite to said first threaded portion, first and second followers on said first and second threaded portions, and connecting means operatively connecting said followers to said plates for shifting said plates upon rotation of said rod.

19. In a dispensing apparatus as defined by claim 18 wherein said connecting means comprises a pair of bell cranks, each pivoted to said support member and having one end connected to one of said plates and the other end connected to one of said followers.

20. In a dispensing apparatus as defined by claim 19 wherein each of said followers defines a bore and said other end of each of said bell cranks includes a pin disposed in said bore.

21. In a dispensing apparatus as defined by claim 20 wherein each of said plates defines an elongated slot and said one end of each of said bell cranks includes a pin slidably disposed in said slot.

22. In a dispensing apparatus as defined by claim 21 wherein said opposed edges of said plates are generally semicircular in plan.

23. In a dispensing apparatus as defined by claim 22 wherein each of said dies comprises a generally tubular member having a circular bore, said opposed edges having a radius of curvature greater than the radius of said bore.

* * * * *

UNITED STATES PATENT AND TRADEMARK OFFICE
CERTIFICATE OF CORRECTION

PATENT NO. : 4,395,427
DATED : July 26, 1983
INVENTOR(S) : Harry A. Fischer et al It is certified that error appears in the above-identified patent and that said Letters Patent is hereby corrected as shown below:

Column 2, line 25;

"shpes" should be --shapes--

Column 7, Claim 10, line 48;

"7" should be --9--

Signed and Sealed this

Seventeenth Day of January 1984

[SEAL]

Attest:

GERALD J. MOSSINGHOFF

Attesting Officer

Commissioner of Patents and Trademarks